A. E. SMITH.
HEATER FOR TANKS.
APPLICATION FILED APR. 19, 1913.
1,118,514.
Patented Nov. 24, 1914.
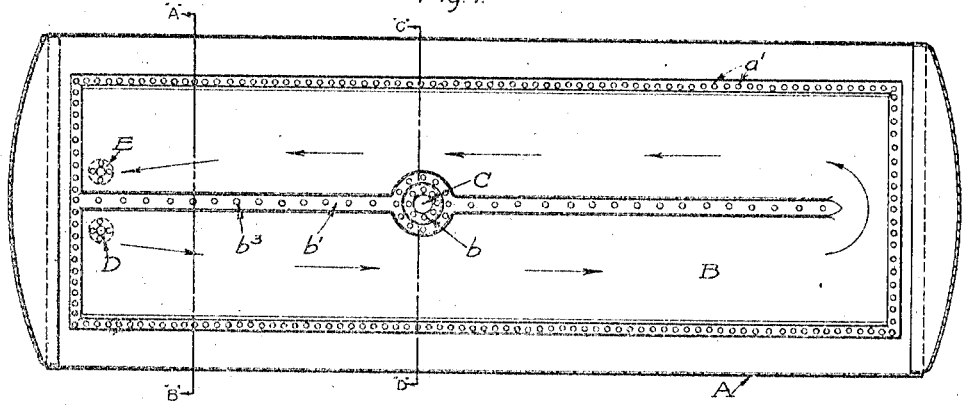
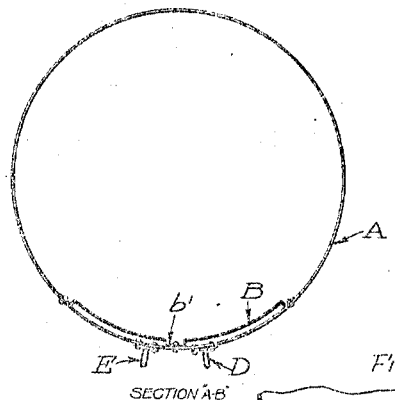
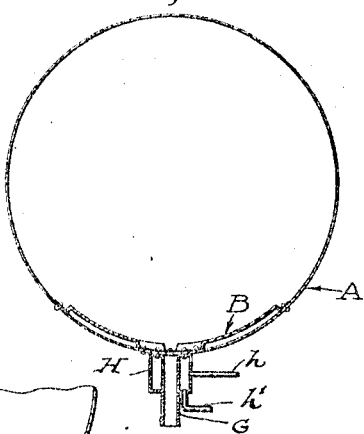
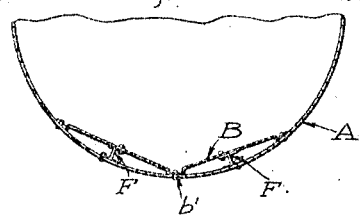
Witnesses:
Arthur Goat
Charles Kelly
Inventor
Abram E. Smith
By Gifford Buel
His Attys

UNITED STATES PATENT OFFICE.

ABRAM E. SMITH, OF NEW YORK, N. Y.

HEATER FOR TANKS.

1,118,514.

Specification of Letters Patent.    Patented Nov. 24, 1914.

Application filed April 19, 1913. Serial No. 762,308.

*To all whom it may concern:*

Be it known that I, ABRAM E. SMITH, a citizen of the United States, residing in the borough of Brooklyn, city of New York, county of Kings, and State of New York, have invented certain new and useful Improvements in Heaters for Tanks, of which the following is a specification.

My invention relates to a heater for tanks and more especially for tank cars whereby the contents of the tanks, when occasion requires, may be heated to permit of the escape of the contents from the tank through an outlet in the tank provided for that purpose.

I will describe a heater for tanks as applied to a tank embodying my invention and then point out the novel features in claims.

In the accompanying drawings Figure 1 is a horizontal sectional view of a tank equipped with a heater and embodying my invention. Fig. 2 is a vertical and transverse sectional view taken on the line A—B of Fig. 1. Fig. 3 is a view similar to Fig. 2 but taken on the line C—D of Fig. 1. Fig. 4 is a detail vertical sectional view showing braces or stiffeners in the heater which may be employed if desired.

Similar letters of reference designate corresponding parts in all of the figures.

A designates a tank which is preferably of metal and may be built up in any desired way. The tank A may be stationary or it may be mounted on wheels for transportation over roads, or it may be mounted on wheels for transportation over railways, and in the latter use the tank A constitutes the tank of what is known as a tank car.

B designates a metal plate, which, in connection with a wall of the tank, constitutes a heater for the contents of the tank. The plate B may be located within the tank as shown in the drawings, or it may be secured outside of the tank. In the case of the application of my invention to a tank car the plate B is located within the tank, whereas, in the application of my invention to a stationary tank, the plate B may be located outside of the tank. The plate B may be of a single piece or made up of sections and is so formed that a space is provided between it and the tank wall. The edge portions of the plate are suitably secured to the wall of the tank, and, as shown in the drawings, rivets $a'$ are employed for this purpose. At that point of the tank which is provided with an outlet C for the contents of the tank, an opening is also provided in the plate which registers with the outlet C. As shown in the drawings, the plate B is provided with a depressed portion $b$, through which the opening is formed and the edge of the depressed portion is suitably secured to the tank wall, here shown as being by rivets.

A suitable inlet D for a heating medium, such as steam, is provided for the heating space afforded by the plate B and the wall of the tank, as well as a suitable outlet E, for the heating medium. In order to provide for a circulation of the heating medium within the heating space, it is divided except at one portion. As here shown, this is accomplished by providing a depressed portion $b'$ intermediate two of its edges for a portion of the length of the plate B, and suitably securing the depressed portion to the wall of the tank, as by rivets $b^2$. Thus the heating space is divided except at the end of the space which is farthest from the outlet E. The direction of circulation of the heating medium is indicated by the arrows.

If desired, the plate B may be braced and stiffened against pressure of steam and the contents of the tank by suitable parts F which may extend wholly or partially the length and breadth of the heating space, or may be made without the depression in the center, in which case the outlet will be located at the opposite end of the tank to the inlet instead of at the same end.

In Fig. 3 I have shown the outlet nozzle G of the tank extending through a suitable heating chamber H, through which a suitable heating medium may be circulated by the inlet $h$ and outlet $h'$.

What I claim as my invention is:—

1. In combination with a tank car, an outlet for said car, a plate secured to the bottom of the tank car at its edge portions and formed to provide a heating space between it and the tank bottom, a depressed portion in said plate having an opening which registers with the outlet, and means for fastening the edge of the depressed portion to the bottom of the tank.

2. In combination with a tank car, a plate secured to the bottom of the tank car at its edge portions, and formed to provide a heating space between it and the tank bottom, means for also securing said plate to the tank bottom intermediate two of its side edges whereby the said space is divided except at one portion, an inlet for one division of said space for a heating medium, and an outlet for the other division of said space for the heating medium.

3. In combination with a tank car, an outlet for said car, a plate secured to the bottom of the tank car at its edge portions and formed to provide a heating space between it and the tank bottom, means for also securing said plate to the tank bottom intermediate two of its edge portions whereby said space is divided except at one portion, an inlet for one division of said space for a heating medium, an outlet for the other division of said space for the heating medium, a depressed portion in said plate having an opening which registers with the outlet, and means for fastening the edge of the depressed portion to the bottom of the tank.

In testimony whereof I have hereunto signed my name in the presence of two subscribing witnesses.

ABRAM E. SMITH.

Witnesses:
E. L. GRIDLEY,
R. M. AHALT.